United States Patent
Tan et al.

(10) Patent No.: US 7,467,460 B2
(45) Date of Patent: Dec. 23, 2008

(54) METHOD OF MANUFACTURING SLIDER

(75) Inventors: ZhiHua Tan, Dongguan (CN);
QuanBao Wang, Dongguan (CN);
YanZeng Ma, Dongguan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 11/698,284

(22) Filed: Jan. 26, 2007

(65) Prior Publication Data

US 2007/0175018 A1   Aug. 2, 2007

(30) Foreign Application Priority Data

Jan. 27, 2006   (CN) .................... 2006 1 0006890

(51) Int. Cl.
*G11B 5/127*   (2006.01)
*H04R 31/00*   (2006.01)

(52) U.S. Cl. .................. 29/603.12; 29/417; 29/603.16;
29/603.18; 216/62; 216/66; 216/68; 360/235.7;
360/235.8; 360/236.3; 360/236.6; 360/237;
451/5; 451/8; 451/10; 451/36; 451/41

(58) Field of Classification Search . 29/603.12–603.16,
29/603.18, 417; 216/62, 66, 67; 360/235.7,
360/235.8, 236.3, 236.5, 236.6, 237; 451/5,
451/8, 10, 36, 37, 41
See application file for complete search history.

(56) References Cited

U.S. PATENT DOCUMENTS

| | | | | |
|---|---|---|---|---|
| 6,073,337 A | * | 6/2000 | Strom | 29/603.12 |
| 6,501,048 B1 | * | 12/2002 | Strom | 219/121.85 |
| 6,631,548 B2 | * | 10/2003 | Chang et al. | 29/603.09 |
| 7,124,497 B1 | * | 10/2006 | Olim et al. | 29/603.09 |

FOREIGN PATENT DOCUMENTS

| | | | |
|---|---|---|---|
| JP | 05174348 A | * | 7/1993 |
| JP | 07335792 A | * | 12/1995 |

* cited by examiner

*Primary Examiner*—Paul D Kim
(74) *Attorney, Agent, or Firm*—Nixon & Vanderhye P.C.

(57) ABSTRACT

A slider manufacturing method includes: providing a row bar constructed from multiple slider bodies having a surface for forming an air bearing surface (ABS); forming multiple cutting lines on the surface for forming an ABS of the row bar; forming a stress absorption region adjacent to the cut line in a cutting region defined by two adjacent cutting lines; grinding the surface for forming an ABS of the row bar; and cutting the row bar along the cutting lines to form multiple individual sliders. When the row bar is cut by a cutter into multiple individual sliders along the cutting lines, stress generated in the cutting region adjacent to cutting lines during cutting is partly or fully absorbed by the stress absorption region, reducing the chances of clear edge jumps forming at the edges of the ABS of the slider after the cutting, and disk surface scratching by the slider.

7 Claims, 12 Drawing Sheets

METHOD OF MANUFACTURING SLIDER

FIELD OF THE INVENTION

The present invention relates to a method for manufacturing disk drive units, and more particularly to a method of manufacturing slider used in disk drive unit that can effectively improve slider's profile.

BACKGROUND OF THE INVENTION

Disk drive unit is a kind of information storage device used widely in the world. The disk drive unit has a very small slider incorporating a read/write transducer therein. The slider is flying above a rotary magnetic medium such as a disk, and moves selectively from track to track of the disk surface to read data from or write data to the disk.

FIG. 1 shows an ideal slider. The slider 100 comprises a planar air bearing surface (ABS) 102. An alumina layer 104 formed at a front side of the slider 100, and a pole 101 is formed at a top portion of the alumina layer 104 to perform data reading/writing operation. A plurality of connecting pads 106 are formed on the alumina layer 104 for electrically connecting the slider 100 with a suspension disposed in the disk drive unit.

However, for making the slider taking off more easily, ABS 204 of an actual slider 200 is a camber-curved surface for aerodynamics concern, as shown in FIG. 2. The camber-curved surface is formed as follows: deforming the slider along its length direction to generate a camber deformation (the deformation is referred as total crown) 202 at the ABS side; deforming the slider along its width direction to generate a camber deformation at the ABS side (the deformation is referred as total cross crown) 206; and deforming the slider along its diagonal direction to generate a camber deformation at the ABS side (the deformation is referred as twist) 203.

The total cross crown (TCC) has two kinds of deformation forms: (1) negative deformation, that is, along the width direction of the ABS side of the slider, a middle portion thereof is lower than both end portions thereof, e.g. as shown in FIG. 3a, the TCC at the side of ABS 304 of the slider 300 is a negative deformation; and (2) positive deformation, that is, along the width direction of the ABS side of the slider, a middle portion thereof is higher than both end portions thereof, e.g. as shown in FIG. 3b, the TCC at the side of ABS 404 of the slider 400 is a positive deformation. In addition, it is usually thought that a slider with positive deformation (TCC) makes disk drive unit have a better and more stable performance, therefore, sliders with positive deformation (TCC) are used in disk drive units for improving working performance thereof. Up to now, there are various manufacturing methods for forming sliders with positive deformation (TCC).

As is known to all, an individual slider is formed by the following steps: processing a row bar constructed by a plurality of slider bodies, and then cutting the row bar into sliders along a plurality of predetermined marks thereon. More specifically, the camber-curved surface is formed by grinding the surface for forming the ABS of the row bar with a specific grinding device; while the cutting process is preformed by a cutter, such as a diamond cutting wheel.

As shown in FIGS. 4a-4b, a manufacturing method for forming sliders with positive deformation (TCC), referred as "row grooving method", includes the following steps: firstly, providing a row bar 500 having an alumina layer 502 at one end thereof, wherein a plurality of poles 501 spaced with each other are formed on the alumina layer 502 along a length direction of the row bar 500; Then, forming a plurality of grooves 504 with a certain width on both ABS 506 and the alumina layer 502 of the row bar 500 along a plurality of cutting lines 503; After that, the surface 506 having grooves 504 therein are pressed against a concave grinding surface 602 of a grinding plate 600 and ground, thereby a positive deformation (TCC) on the surface 506 are formed; Then, the row bar 500 are cut along the cutting lines 503 (at both sides of each groove 504) by a cutter, such as a diamond cutting wheel, to produce a plurality of individual sliders 400 (see FIG. 3b). However, during the cutting process, it is prone to produce side surface stress (cutting stress) on fracture face of the slider 400, and the side surface stress is difficult to eliminate or weaken during the cutting process or after the cutting process. As a result, edge jumps 407 are formed at both ends of the ABS 404 along a width direction of the slider 400. When the slider 400 flies above the disk, the ABS 404 thereof faces to the disk surface, and only a very small flying height is maintained between the ABS 404 and the disk surface. Since these edge jumps 407 are formed at both ends of the ABS 404 along the width direction of the slider 400, when an impact or shock happens to the disk drive, these edge jumps 407 on the slider 400 has a danger to scratch the disk surface so as to damage the disk and/or slider, and thus debasing working performance of the disk drive. Furthermore, as a plurality of grooves are formed on the alumina layer 502, so a continuity of the transducers (poles) in the alumina layer 502 is broken. However, for some type of wafers, such as tunnel magneto-resistive (TMR) wafers, transducers in the alumina layer 502 must be continuous. As a result, the manufacturing method cannot manufacture e.g. tunnel magneto-resistive (TMR) wafers, i.e., the method has a great limitation in use.

FIGS. 5a-5b illustrate another slider manufacturing method referred as "single scribing line method". The method includes the following steps: firstly, scribing a point scribe line 709 at a middle position between two cutting lines 703 on an ABS 706 of a row bar 700 using a scribing tool, such as a laser scriber; Then, pressing the ABS 706 against a concave grinding surface 602 of a grinding plate 600 for grinding so as to generate a positive deformation (TCC) on the ABS 706; After that, cutting the row bar 700 along the cutting lines 703 by a cutter, such as a diamond cutting wheel to produce a plurality of individual sliders 400 (see FIG. 3b). Because the point scribe lines 709 are scribed by the scriber only on the ABS 706, but not on the alumina layer 702, so the alumina layer 702 can be protected effectively. However, side surface stress is still produced on fracture face of the slider 400, and difficult to eliminate or weaken during the cutting process or after the cutting process. Consequently, a plurality of clear edge jumps 407 still remains at edges of the slider 400, which maybe cause damage to the slider and /or the disk.

In addition, as shown in FIG. 3a, when producing a negative deformation (TCC) using the abovementioned method, a plurality of clear edge jumps 305 are still generated at both ends of the ABS 304 along a width direction of the slider 300.

For eliminating or reducing the side surface stresses generated in row bar cutting region (side portion of slider) during cutting process, so as to avoid producing edge jumps or reduce height of edge jumps on the slider, there is a need to provide an improved slider manufacturing method to solve the above-mentioned problems.

SUMMARY OF THE INVENTION

One aspect of the present invention is to provide a slider manufacturing method which can provide a pre-stress on the ABS of the row bar, the pre-stress can counterbalance or weaken cutting stress generated in cutting process so as to avoid producing edge jumps on the slider or reduce a height of the edge jump on the slider.

Another aspect of the invention is to provide a slider manufacturing method in which a positive deformation (TCC) is obtained by grinding the ABS of the row bar with a concave grinding surface.

To achieve the above aspects, a slider manufacturing method of the invention comprises: providing a row bar constructed by a plurality of slider bodies which has a surface for forming air bearing surface; forming a plurality of cutting lines on the surface for forming air bearing surface of the row bar; forming a stress absorption region adjacent to the cut line in a cutting region defined by two adjacent cutting lines; grinding the surface for forming air bearing surface of the row bar; and cutting the row bar along the cutting lines to form a plurality of individual sliders.

In an embodiment of the invention, the stress absorption region is formed by at least one point scribe line formed adjacent to the cut line. The point scribe line has a depth ranges from 0.1 to 0.5 µm, preferably 0.3 µm.

In an embodiment of the invention, the point scribe line is a beeline parallel to and shorter than the cutting line. The row bar comprises a slider substrate layer and an alumina layer formed at an end of the slider substrate layer, and the point scribe line is formed only on the slider substrate layer. The at least one point scribe line has a closest point scribe line to the cut line which has a distance less than 150 µm to the cut line. In the invention, the distance is preferably 5 µm.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 4b shows a top plan view of the row bar shown in FIG. 4a;

FIG. 5b is a top plan view of the row bar shown in FIG. 5a;

DETAILED DESCRIPTION OF ILLUSTRATED EMBODIMENTS

Various preferred embodiments of the instant invention will now be described in conjunction with the drawings. As illustrated above, the invention provides a slider manufacturing method to form a stress absorption region adjacent to slider cut line in a cutting region defined by two adjacent slider cutting lines. When the row bar is cut by a cutter, such as a diamond cutting wheel, into a plurality of individual sliders along the slider cutting lines, the cutting stress generated in cutting process is partly or fully absorbed by the stress absorption region, thus avoiding forming clear edge jumps at the edges of the ABS of the slider after cutting process, and then a risk that the slider to scratch the disk surface can be eliminated. More specifically, the slider manufacturing method of the invention forms at least one point scribe line of a certain depth at the cutting region adjacent to the cutting lines of the row bar in advance using a scribing tool, e.g. laser scriber, before grinding and cutting the row bar so as to define a stress absorption region in the slider cutting region adjacent to the cutting lines.

Figure 1:
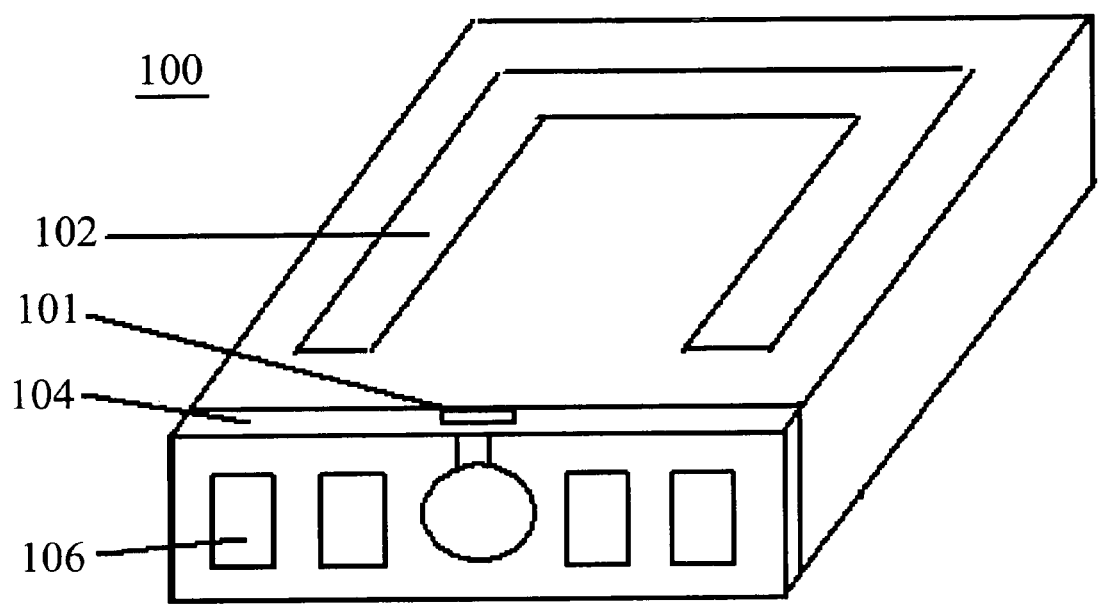
FIG. 1 is a perspective view of a slider in an ideal state.
Figure 2:
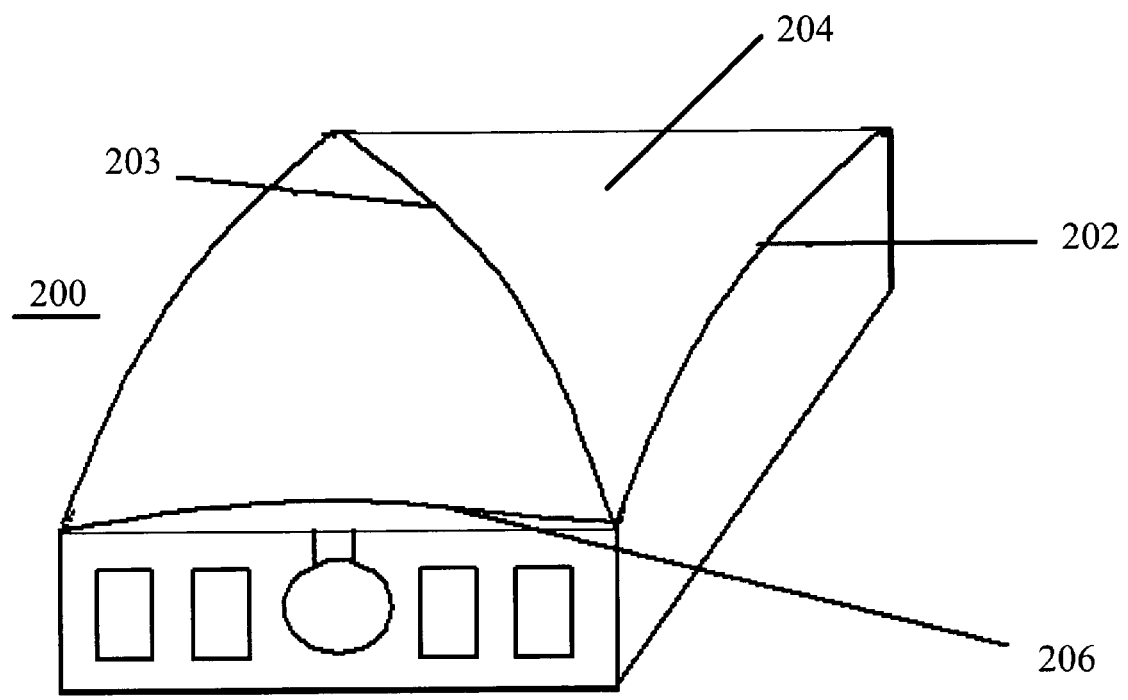
FIG. 2 is a perspective view of an actual slider.
Figure 3A:
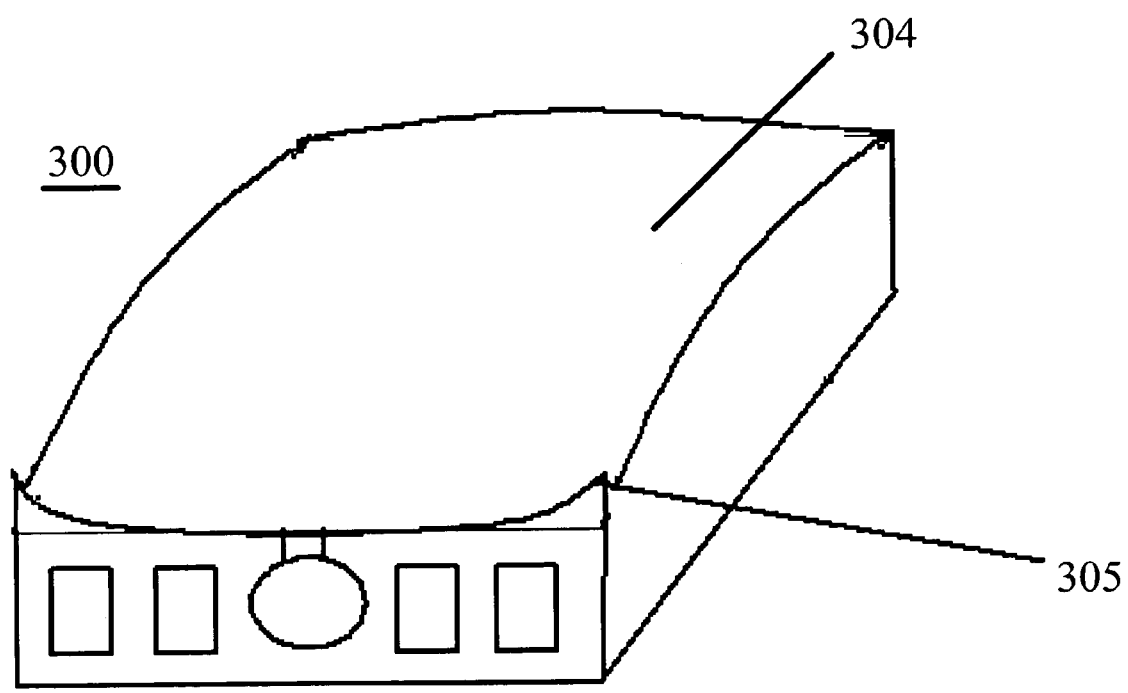
FIG. 3a is a perspective view of a slider with a negative total cross crown (TCC), which also illustrates edge jumps on the slider.
Figure 3B:
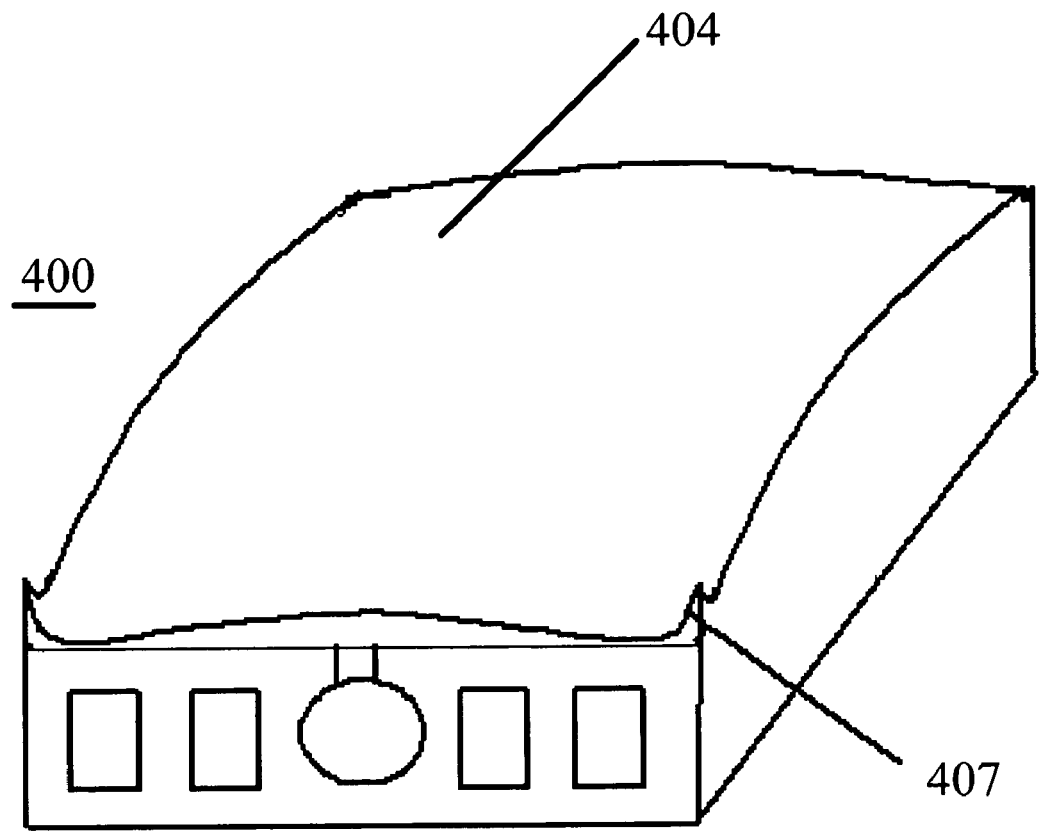
FIG. 3b is a perspective view of a slider with a positive TCC, which also illustrates edge jumps on the slider.
Figure 4A:
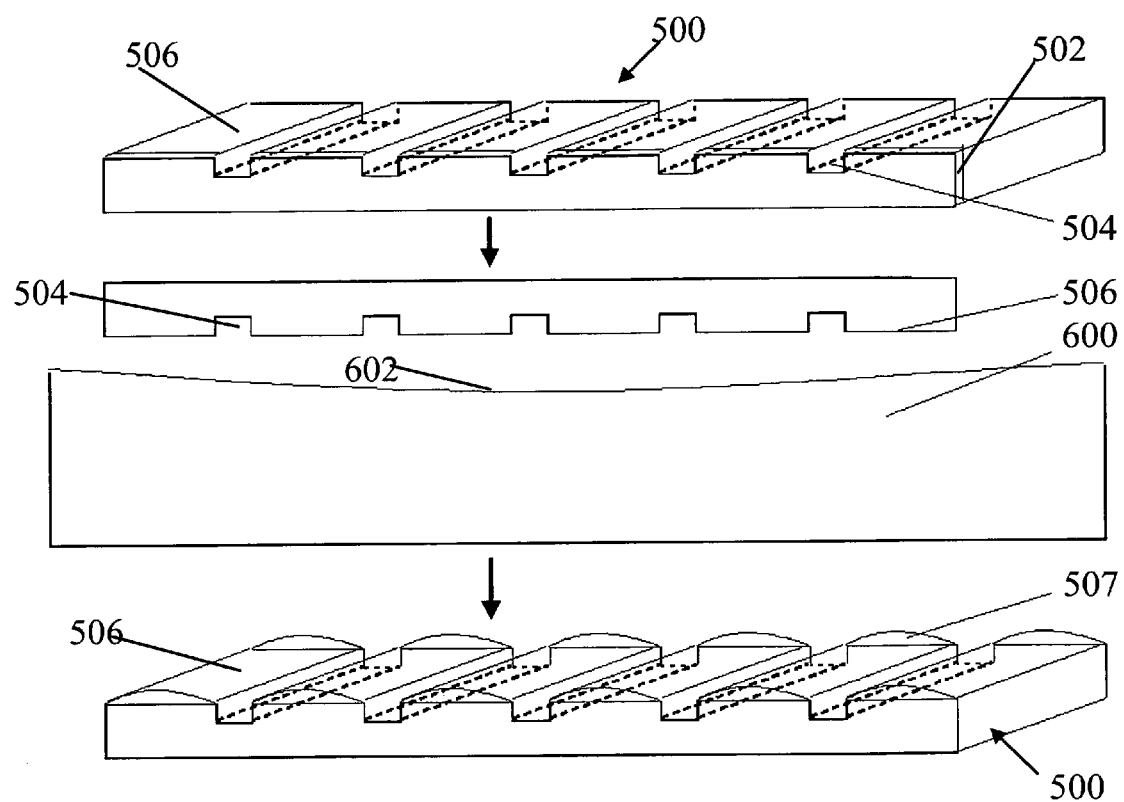
FIG. 4a illustrates a process of processing a row bar to form sliders using row grooving method.
Figure 4B:
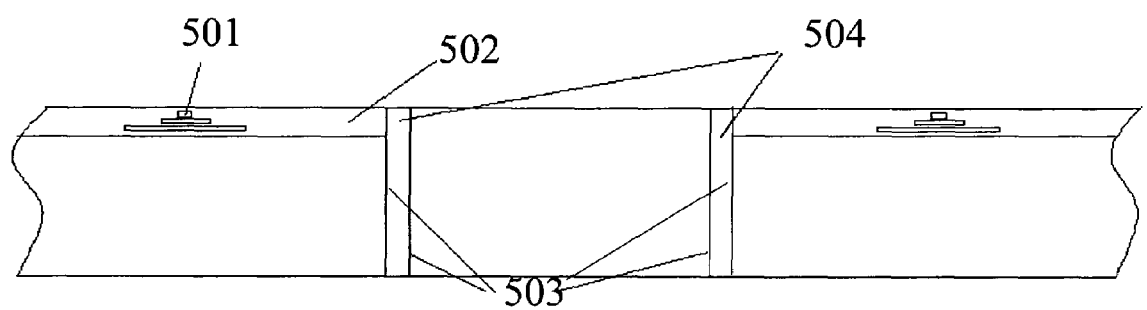
Figure 5A:
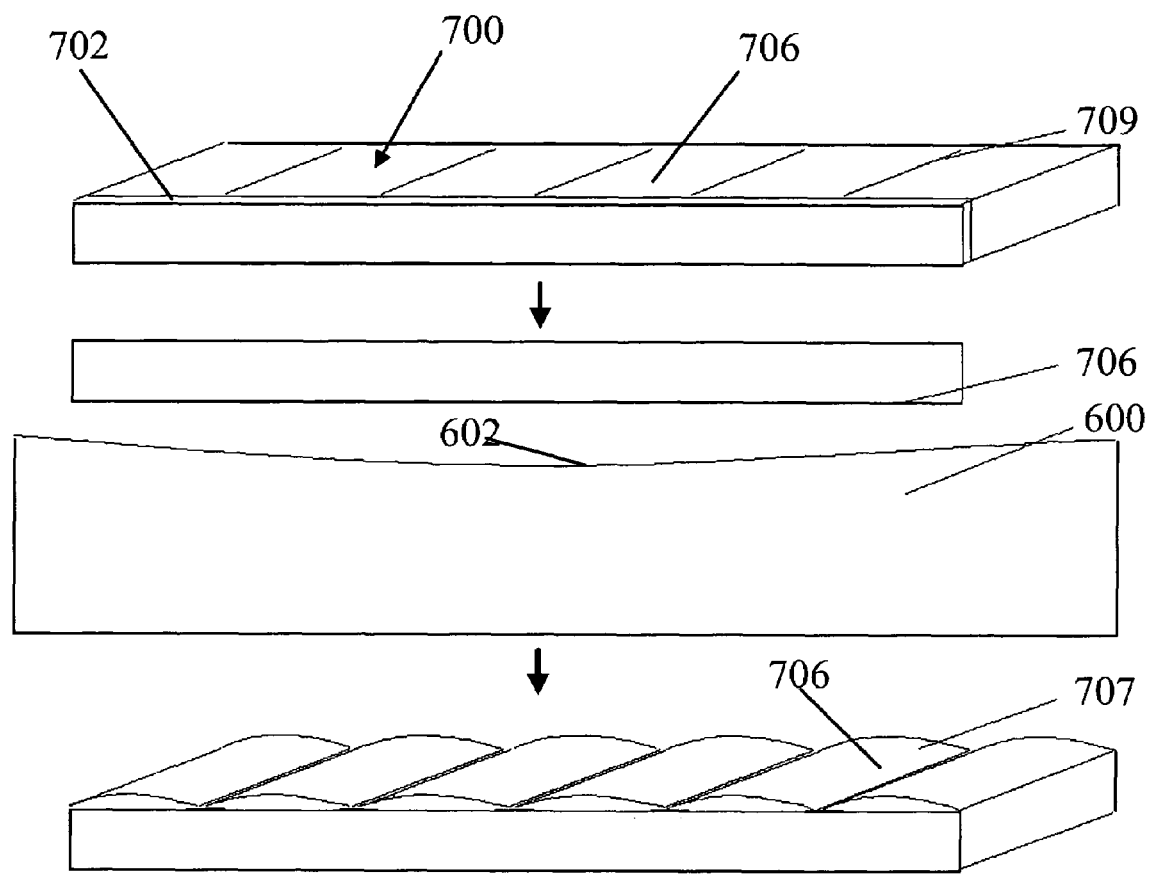
FIG. 5a illustrates a process of processing a row bar to form sliders using single point scribe line method.
Figure 5B:
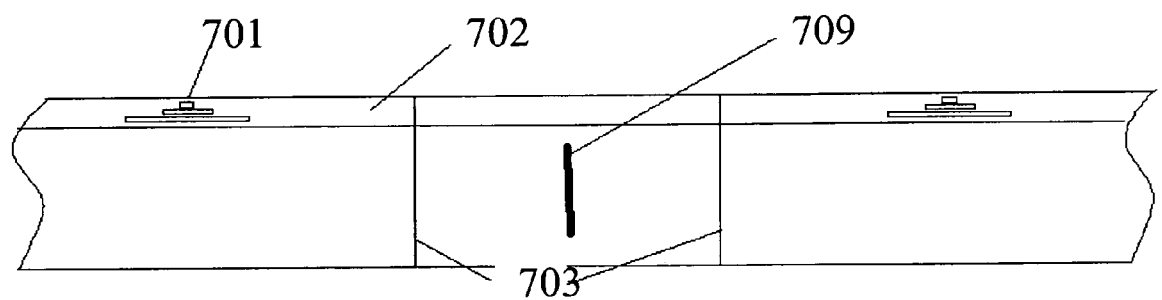
Figure 6:
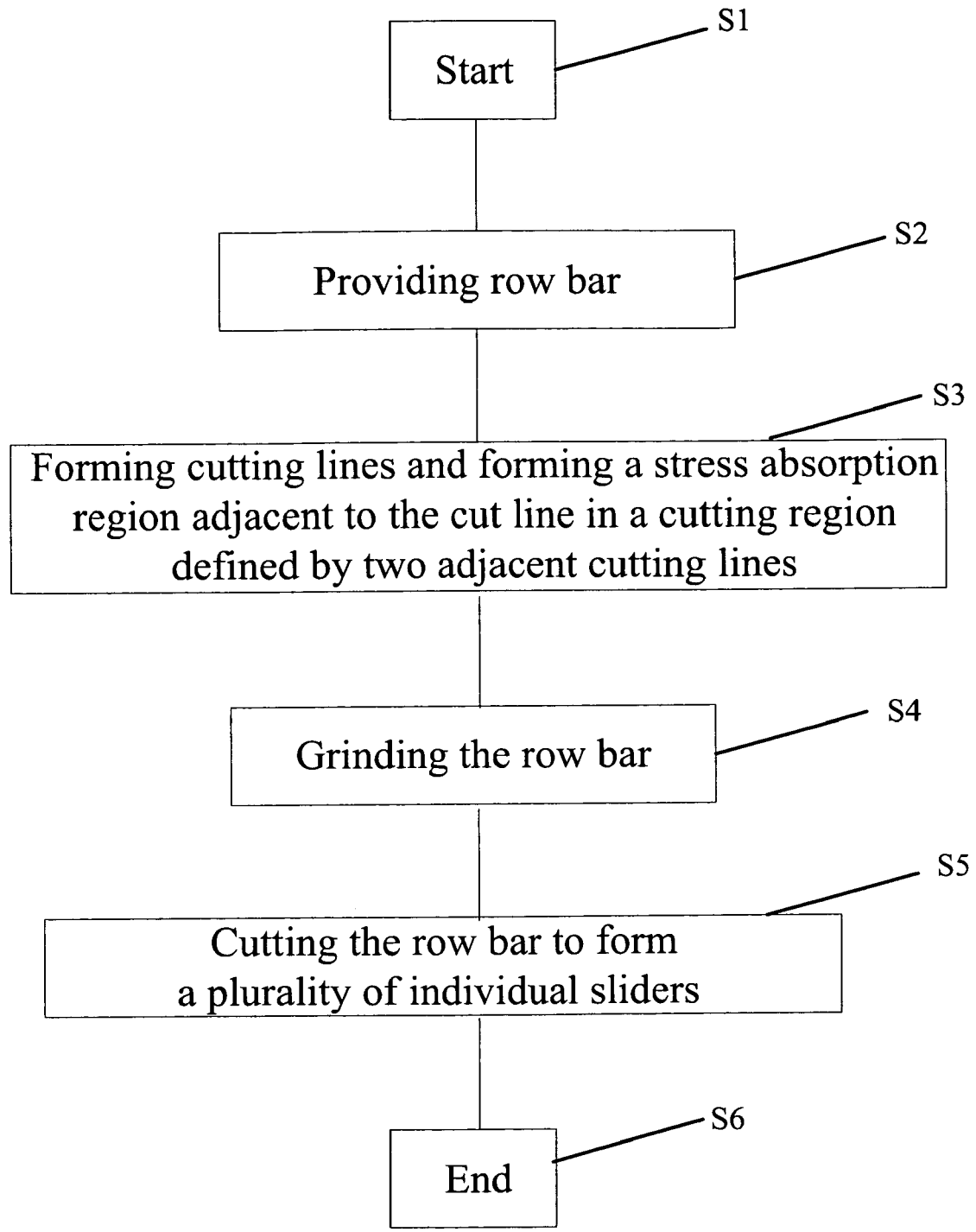
FIG. 6 is a flowchart illustrating a slider manufacturing method according to an embodiment of the invention.

Referring to FIG. 6, a slider manufacturing method of the invention is described. When it starts (step S1), firstly, providing a row bar having a surface for forming ABS (ABS-forming surface) and constructed by a plurality of slider bodies (step 2); then forming a plurality of cutting lines on the ABS-forming surface of the row bar and forming a stress absorption region adjacent to the cut line in a cutting region defined by two adjacent cutting lines (step 3); grinding the ABS-forming surface of the row bar (step 4); cutting the row bar along the cutting lines to form a plurality of individual sliders (step 5); then the process is end (step 6).

Figure 7:
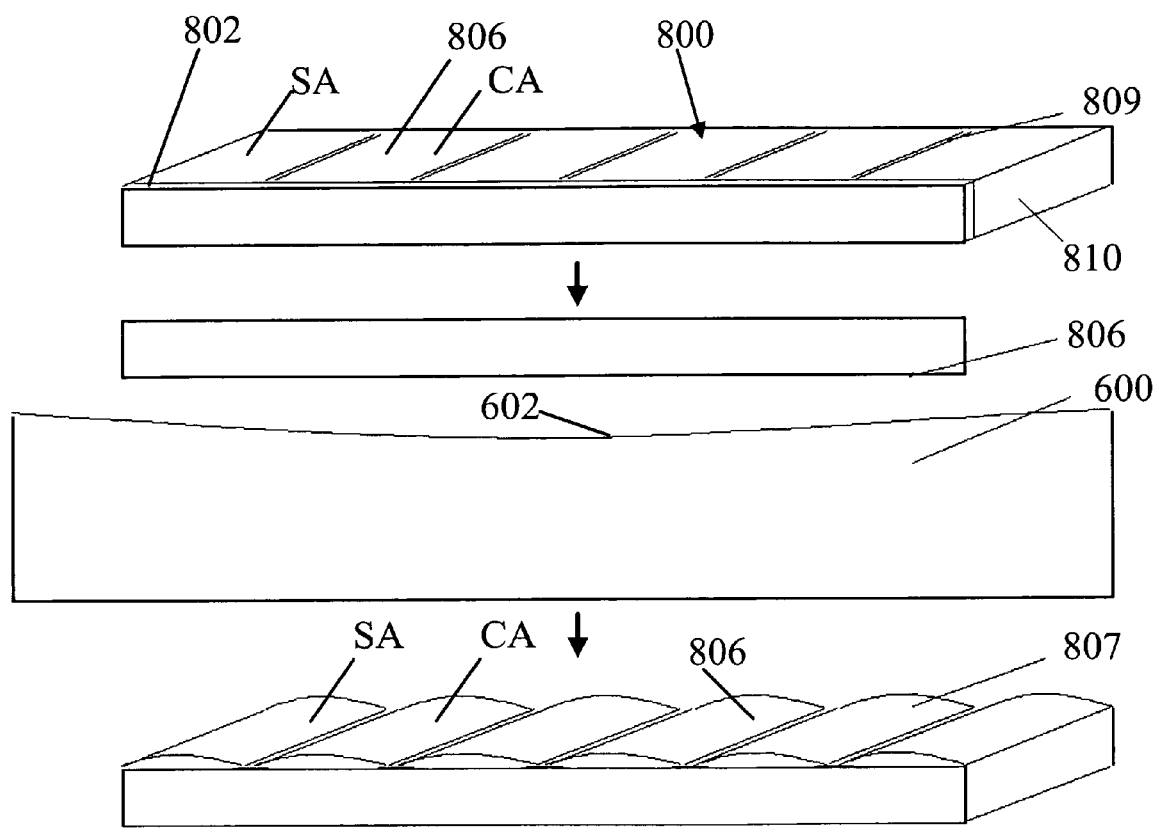
FIG. 7 illustrates a process of processing a row bar to form sliders by a slider manufacturing method according to an embodiment of the invention.
Figure 8:
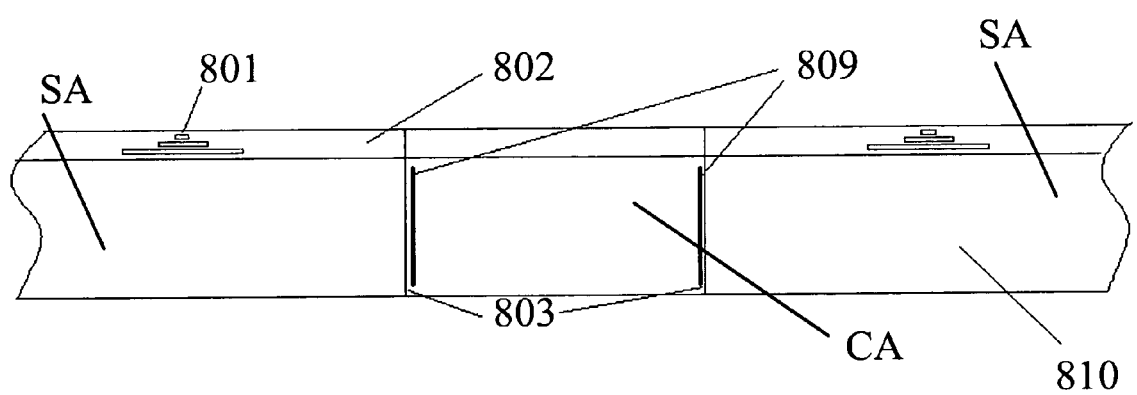
FIG. 8 shows a top plan view of the row bar shown in FIG. 7.

Referring to FIGS. 7-8, according to an embodiment of the invention, firstly, provide a row bar 800. The row bar 800 along its width direction comprises an alumina layer 802 formed at an end thereof, a slider substrate layer 810 connected with the alumina layer 802 of the row bar 800. An ABS-forming surface 806 is formed at a surface of the row bar 800. The row bar 800 is constructed by a plurality of slider bodies SA along its length direction, and each slider body has a pole 801 to achieve data reading/writing operation. Then, two cutting lines 803 are formed to define a cutting region CA in the ABS-forming surface 806 between the two adjacent slider bodies SA. Next, a point scribe line 809 of a certain depth is formed in the cutting region CA, which is on the ABS-forming surface 806 of the row bar 800 and adjacent to the cutting line 803, by scribing tool, such as laser scriber, thereby forming a stress absorption region (not labeled) in the cutting region CA adjacent to the cutting line 803. After that, the ABS-forming surface 806 of the row bar 800 is grinded by a grinding tool. Finally, the row bar 800 is cut by a cutter, such as a diamond cutting wheel, along cutting lines 803 to form a plurality of individual sliders 900 (see FIG. 9). As shown in FIG. 7, only a process of grinding the row bar to form total cross crown (TCC) deformation at ABS side is shown. Other grinding process, such as the process of grinding to form total crown (TC) deformation, and the process of grinding to form a diagonal camber deformation (Twist) along a diagonal direction at the ABS side of the row bar is similar to the grinding process to form TCC, thus a description thereof is omitted herefrom.

Referring to FIG. 7, the grinding process to form TCC deformation of the row bar is performed by press the row bar 800 against a concave grinding surface 602 of a grinding plate 600 to grind the row bar 800. In addition, in the embodiment, the point scribe lines 809 are beelines parallel to and shorter than the cutting lines 803 so as to absorb the stress produced in the cutting process more quickly and evenly. Furthermore, the point scribe lines 809 are only formed on the slider substrate layer 810, but not formed on the alumina layer 802, therefore the alumina layer 802 can be protected effectively. In the invention, the point scribe line 809 may have a distance less than 150 μm to its adjacent cutting line 803. Preferably, the distance is 5 μm.

Figure 9:
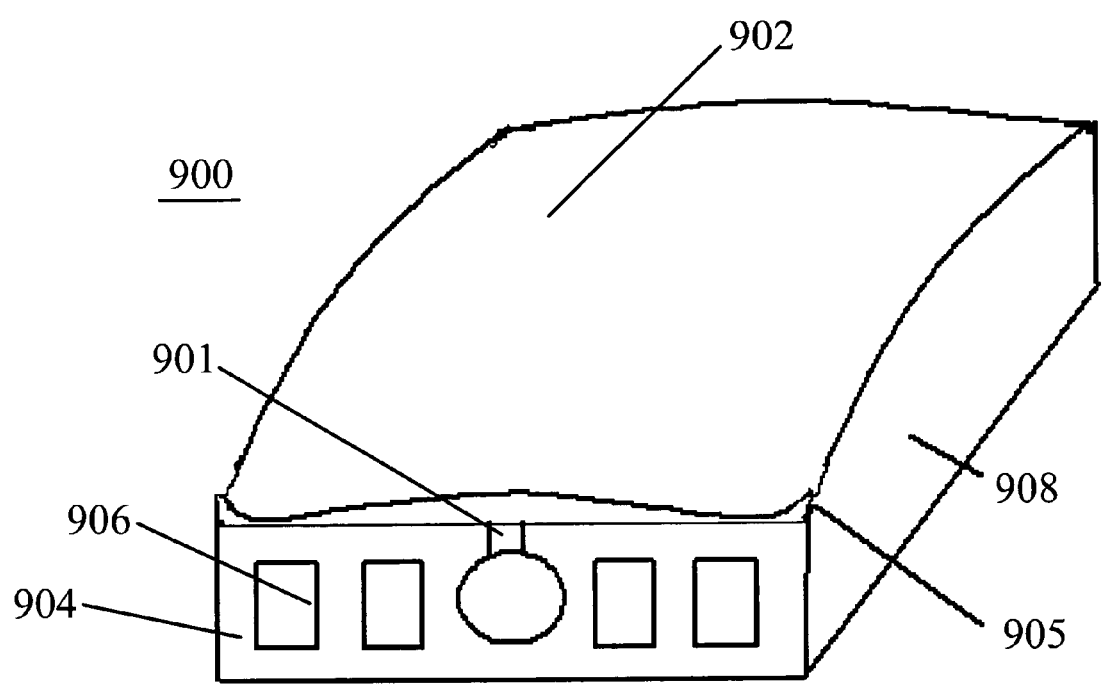
FIG. 9 is a perspective view of a slider formed by a slider manufacturing method according to an embodiment of the invention, wherein the slider has a positive TCC and small edge jumps on edges thereon.

In the embodiment, when the row bar 800 is cut along the cutting lines 803, the cutting stress generated at edges of the slider bodies adjacent to the cutting lines is absorbed by the stress absorption region defined by the point scribe lines 809 immediately, thereby avoiding or reducing clear edge jumps formed on side surfaces 908 of the slider after the cutting process. Referring to FIG. 9, only a plurality of very small edge jumps 905 are formed on both ends of the ABS 902 along a width direction of the slider 900, and in the embodiment, the height of the edge jump 905 is lower than 2 nm.

In the invention, because the alumina layer 802 is protected from damage since the point scribe lines 809 are not formed on the alumina layer 802, so the slider manufacturing method of the invention may apply to various types of row bars, for example, row bar constructed by tunnel magneto-resistive (TMR) slider bodies or by giant magneto-resistive (GMR) slider bodies. In an embodiment of the invention, for purpose of absorbing cutting stress generated during cutting process more effectively, the point scribe line 809 may have a depth ranging from 0.1 μm to 0.5 μm and preferably 0.3 μm.

In addition, though only one point scribe line is formed adjacent to the cutting line for absorbing stress. However, understandingly, in other embodiments of the invention, depending on magnitude of cutting stress generated during cutting process, two or more point scribe lines may also be formed adjacent to the cutting line in order to absorb a larger stress generated during cutting process.

Of course, the point scribe line formed on the row bar is not limited to beeline, other point scribe line of any suitable configuration or shape capable of absorbing cutting stress generated during cutting process may also be applied to the invention.

In FIG. 7, only grinding process of forming positive TCC is illustrated. However, understandingly, the cutting stress generated in cutting process may also be absorbed by the point scribe lines in a grinding process of forming negative TCC. Accordingly, no clear edge jump will be formed at both ends of the ABS along a width direction of the slider.

Furthermore, the stress absorption region defined by two adjacent cutting lines and near the cutting line is not limited to point scribe line scribed thereon; any other suitable means capable of absorbing stress may also be applied to the invention.

Compared to prior art, the slider manufacturing method of the invention employs the stress absorption region defined by two adjacent cutting lines and near the cutting line to absorb cutting stress generated on the ABS during the row bar cutting process, therefore, no clear edge jump will be formed on the ABS of the slider, for example formed at both ends of the ABS along width direction of the slider. Thus, scratching of the disk by the slider is avoided or at least reducing the possibility of collision between the slider and/or the disk, accordingly, a damage to slider/disk is avoided.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A method of manufacturing a slider, the method comprising:
providing a row bar constructed by a plurality of slider bodies which has a surface for forming an air bearing surface;
forming a plurality of cutting lines on the surface for forming the air bearing surface of the row bar;
forming a stress absorption region adjacent to a cutting line in a cutting region defined by two adjacent cutting lines;
grinding the surface for forming the air bearing surface of the row bar; and
cutting the row bar along the cutting lines to form a plurality of individual sliders,
wherein the stress absorption region is formed by forming at least one point scribe line for absorbing stress, the point scribe line being closer to one cutting line of the two adjacent cutting lines than the other cutting line of the two adjacent cutting lines.

2. The slider manufacturing method according to claim 1, wherein the point scribe line has a depth of 0.3 μm.

3. The slider manufacturing method according to claim 1, wherein the point scribe line is a beeline parallel to and shorter than the cutting line.

4. The method according to claim 1, wherein the row bar comprises a slider substrate layer and an alumina layer formed at an end of the slider substrate layer, and the point scribe line is formed only on the slider substrate layer.

5. The method according to claim 1, wherein the at least one point scribe line has a closest point scribe line to the cutting line which has a distance less than 150 μm to the cutting line.

6. The method according to claim 1, wherein the at least one point scribe line has a closest point scribe line to the cutting line which has a distance of 5 μm to the cutting line.

7. The slider manufacturing method according to claim 1, wherein the point scribe line has a depth ranging from 0.1 to 0.5 μm.

* * * * *